US010983293B1

(12) United States Patent
Leigh et al.

(10) Patent No.: US 10,983,293 B1
(45) Date of Patent: Apr. 20, 2021

(54) ELECTRO-OPTICAL HOT-PLUGGABLE MODULE WITH A DUAL-PURPOSE HEAT TRANSFER PLATE

(71) Applicant: HEWLETT PACKARD ENTERPRISE DEVELOPMENT LP, Houston, TX (US)

(72) Inventors: Kevin B. Leigh, Houston, TX (US); Everett R. Salinas, Houston, TX (US); Wade D. Vinson, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/805,593

(22) Filed: Feb. 28, 2020

(51) Int. Cl.
*G02B 6/42* (2006.01)
*H04B 10/40* (2013.01)

(52) U.S. Cl.
CPC ......... *G02B 6/4292* (2013.01); *G02B 6/4246* (2013.01); *G02B 6/4271* (2013.01); *H04B 10/40* (2013.01)

(58) Field of Classification Search
CPC .. G02B 6/4292; G02B 6/4246; G02B 6/4271; H04B 10/40
USPC ........................................................ 398/139
See application file for complete search history.

(56) References Cited

U.S. PATENT DOCUMENTS

| | | | |
|---|---|---|---|
| 7,125,261 B2 | 10/2006 | Yoshikawa et al. | |
| 2006/0133043 A1* | 6/2006 | Boudreaux | H05K 1/144 |
| | | | 361/704 |
| 2011/0317964 A1* | 12/2011 | Downs | G02B 6/4201 |
| | | | 385/92 |
| 2012/0148202 A1* | 6/2012 | Banal, Jr. | G02B 6/4244 |
| | | | 385/93 |
| 2014/0203175 A1* | 7/2014 | Kobrinsky | H01L 24/83 |
| | | | 250/214.1 |
| 2014/0345297 A1* | 11/2014 | Saeki | G02B 6/4271 |
| | | | 62/3.6 |
| 2015/0362686 A1* | 12/2015 | Wang | G02B 6/4292 |
| | | | 385/89 |
| 2016/0341920 A1* | 11/2016 | Stapleton | G02B 6/4269 |
| 2017/0150645 A1* | 5/2017 | Huang | G02B 6/4278 |
| 2019/0132994 A1 | 5/2019 | Johnson et al. | |
| 2019/0146167 A1 | 5/2019 | Leigh et al. | |
| 2019/0204516 A1* | 7/2019 | Chen | G02B 6/4281 |

(Continued)

FOREIGN PATENT DOCUMENTS

JP   2019-113784 A   7/2019

OTHER PUBLICATIONS

Norman Quesnel, "Industry Developments: Cooling QSFP Optical Transceivers", Advanced Thermal Solutions, available online at <https://www.qats.com/cms/2017/08/07/industry-developments-cooling-qsfp-optical-transceivers/>, Aug. 7, 2017, 6 pages.

*Primary Examiner* — Dalzid E Singh
(74) *Attorney, Agent, or Firm* — Hewlett Packard Enterprise Patent Department

(57) ABSTRACT

Hot-pluggable optical modules for high-density optical signaling are provided. The modules comprise a dual-purpose heat spreader configured to function as a thermal component and including trenches accommodating optical infrastructure. The dual-purpose heat spreader includes a trench for routing optical fibers to and from a plurality of optical connectors, each disposed on a branch of the fiber harness assembly and configured to mate with a socket on a module board through an opening in the dual-purpose heat spreader.

17 Claims, 7 Drawing Sheets

(56) References Cited

U.S. PATENT DOCUMENTS

2019/0278037 A1     9/2019  Leigh et al.
2020/0057218 A1*    2/2020  Islam .................. G02B 6/4269

* cited by examiner

ELECTRO-OPTICAL HOT-PLUGGABLE MODULE WITH A DUAL-PURPOSE HEAT TRANSFER PLATE

DESCRIPTION OF RELATED ART

Optical modules are typically hot-pluggable optical transceiver devices used in high-bandwidth data communications applications. Optical modules with high-speed signal interfaces generally have optical connectors disposed on a faceplate, enabling external optical cables to be connected (e.g., to a server node). A common hot-pluggable optical module used in high-bandwidth communications is the small form-factor pluggable (SFP) interface module and its variations (e.g., Quad SFP (QSFP)).

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1A:
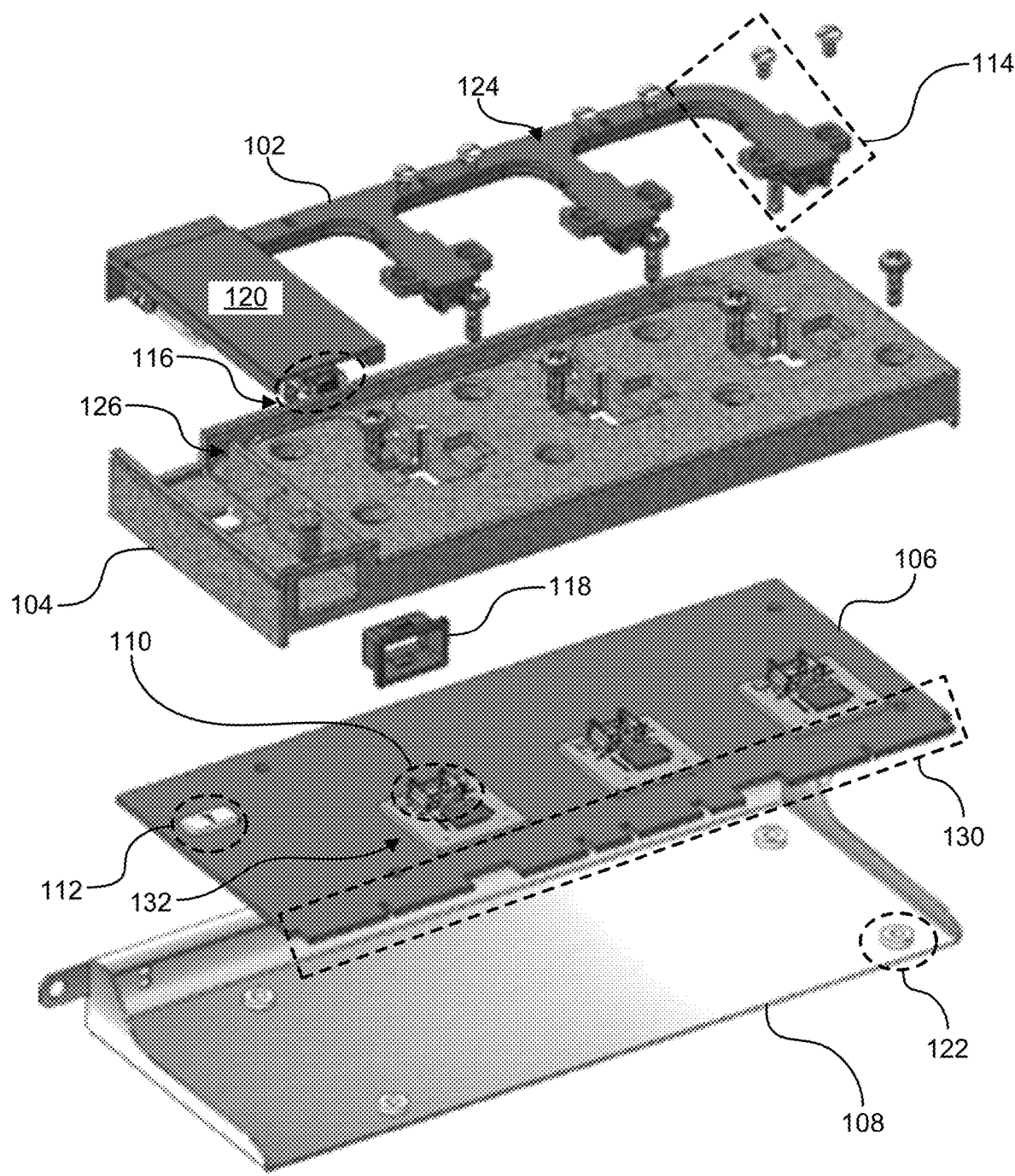
FIG. 1A shows an exploded, perspective view of an example electro-optical hot-pluggable optical module in accordance with embodiments of the technology disclosed herein.

The figures are not exhaustive and do not limit the present disclosure to the precise form disclosed.

DETAILED DESCRIPTION

Current hot-pluggable optical modules have large overheads arising from a low lane count. Many conventional modules provide a small number of optical lanes, such as the 4-lane QSFP devices or the double density 8-lane QSFP (QSFP-DD) devices. For large scale installations requiring a high density of lanes in a node, the low-lane capacity of conventional modules requires a large area on the faceplate of the node to provide receptacles for the external optical cables. Even higher-density emerging optical transceiver modules having upwards of 32-lanes still require a large amount of real estate on the faceplate to provide connections to external optical cables. Therefore, these hot-pluggable modules are not suitable for use in communications systems with small form factors, which lack a large enough faceplate space for the large number of external connections required. This is especially true for systems such as line cards, which are modular electronic circuits (disposed on a printed circuit board (PCB)) designed to fit within a socket or other connector of a larger PCB (e.g., a motherboard of a server node).

Moreover, because conventional hot-pluggable optical modules include connectors disposed on a faceplate for interfacing with external optical cables, additional devices are required in order to implement efficient, but complex, network architectures. Optical fiber shuffles must be used, that are located outside of the system (e.g., a node with the pluggable module installed). Fiber shuffles (also referred to as optical shuffles) allow for complex fiber routings, taking the optical fibers from an optical connector and routing the fibers to a plurality of different target output connectors, thereby allowing for signals from multiple input optical connectors to be routed to different output connectors. These shuffles are expensive to design and manufacture, and also result in complex, bulky fiber bundles external to the system (e.g., node). Current hot-pluggable optical modules lack internal optical infrastructure, such as fiber routing, meaning that expensive, external fiber shuffles are required for any complex fiber routing.

Embodiments of the technology disclosed herein provides a novel approach to hot-pluggable optical modules to enable high-density optical signaling (i.e., high-lane counts) compared with traditional hot-pluggable optical modules. Accordingly, hot-pluggable optical modules in accordance with embodiments of the technology disclosed herein are suitable for use with systems having low-overhead requirements, such as line cards within a server node. The pluggable optical module embodiments described herein are designed with an internal optical fiber infrastructure enabling for optical shuffling to be contained within the hot-pluggable module itself. A heat spreader as described herein is a "dual-purpose heat spreader" because it is configured not only to provide a heat sink to assist in moving heat away from the operational components of the module but also to allow optical fibers to be routed (as required) from an input optical connector to a plurality of different optical chips (containing the opto-electronic components of the module).

FIG. 1A depicts an exploded, perspective view of an example electro-optical hot-pluggable optical module 100 in accordance with embodiments of the technology disclosed herein. The example module 100 is provided for illustrative purposes only and should not be interpreted as limiting the scope of the technology disclosed herein to only the illustrated embodiment. As shown in FIG. 1A, the module 100 comprises a fiber harness assembly 102, a dual-purpose heat spreader 104, a module board 106, and a carrier 108. The fiber harness assembly 102 can be configured to provide support for the optical infrastructure of the module 100. In various embodiments, the fiber harness assembly 102 comprises a plurality of optical connection branches 114, with each branch 114 corresponding to a socket 110 of an integrated circuit 132 disposed on the module board 116. In some embodiments, the fiber harness assembly 102 may be constructed monolithically, while in other embodiments each branch 114 may be connected to a fiber harness assembly spine 124. The socket 110 and integrated circuit 132 includes the opto-electronics for converting the optical signals into electronic signals (and vice versa). In various embodiments, the fiber harness assembly 102 may include a number of branches 114 equal to the number of integrated circuits 132 disposed on the module board 106. In some embodiments, the fiber harness assembly 102 can include a connector bay cover 120 configured to cover an optical blindmate connector 116 of the optical infrastructure, while in other embodiments the connector bay cover 120 may be a separate component from the fiber harness assembly 102. The fiber harness assembly 102 can comprise one or more different materials, including but not limited to, metal, plastic, alloy, or a combination thereof.

Figure 1B:
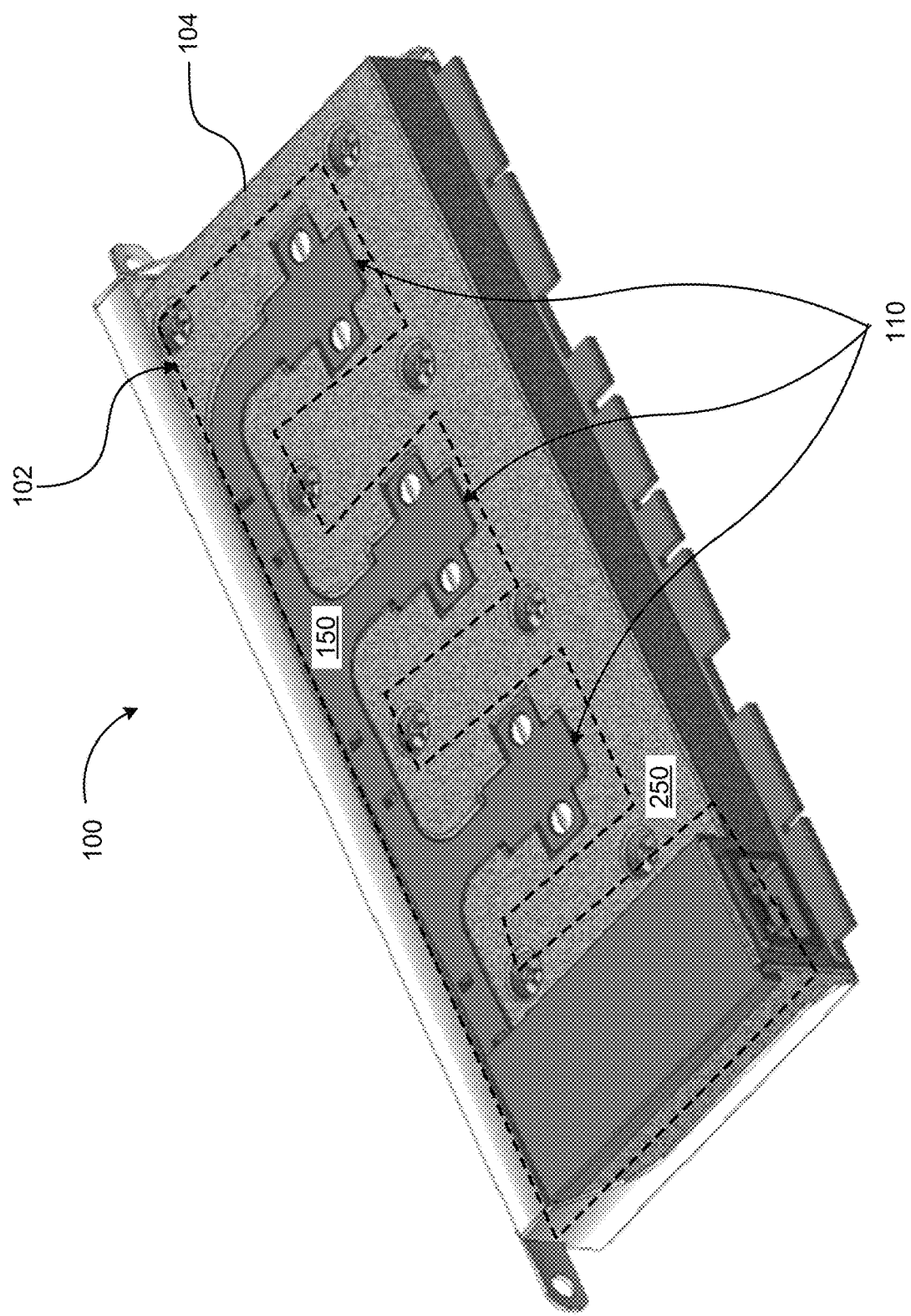
FIG. 1B shows the electro-optical hot-pluggable optical module of FIG. 1A in a constructed or assembled state in accordance with embodiments of the technology disclosed herein.
Figure 2:
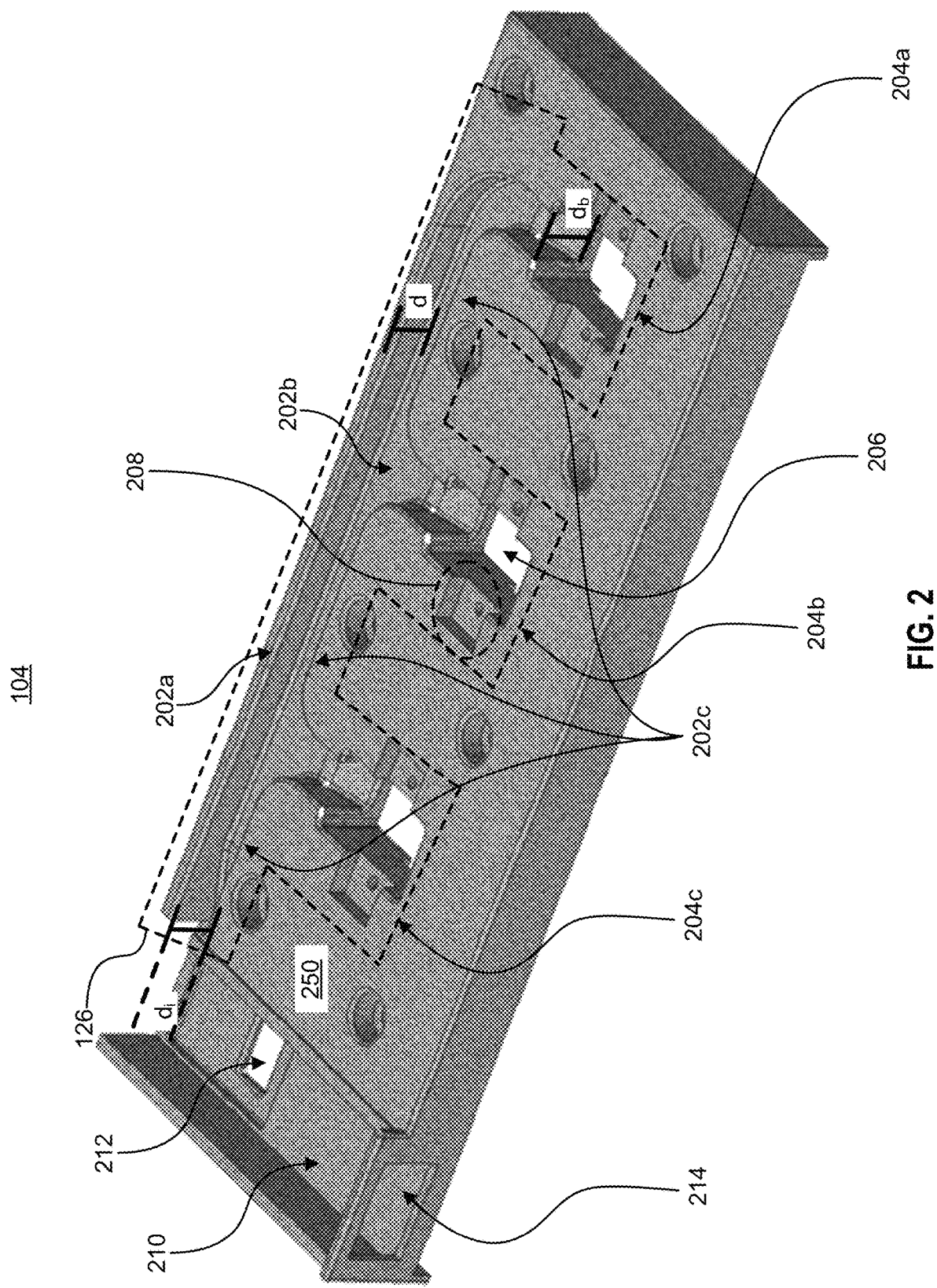
FIG. 2 shows an example dual-purpose-use heat spreader in accordance with embodiments of the technology disclosed herein.

The fiber harness assembly 102 is configured to enclose and support the optical infrastructure of the module 100, providing flexibility in implementation. A plurality of fiber retention features (features 320 in FIG. 3) on an underside of the fiber harness assembly 102 are configured to secure the optical fibers routed from a fiber box (fiber box 310 in FIG. 3) to each branch 114. Rather than designing a separate fiber harness assembly 102 for each given implementation, a variety of different optical infrastructure architectures can be implemented without the need to redesign the fiber harness assembly 102. As a non-limiting example, in some embodiments the number of optical channels may not require the use of all of the sockets 110 of the module board 106, resulting in one or more branches 114 of the fiber harness assembly 102 not supporting any optical connector configured to interface with the corresponding socket 110. The fiber harness assembly 102 is configured to rest within the dual-purpose heat spreader 104. As shown in FIG. 1B, the fiber harness assembly 102 is configured to rest within a trench 126 (as shown in FIGS. 1A and 2) of the dual-purpose heat spreader 104, such that the fiber harness assembly 102 rests below a top surface of the dual-purpose heat spreader 104 (shown in FIG. 2 as surface 250). In this way, the fiber harness assembly 102 does not interfere with the thermal operation of the dual-purpose heat spreader 104; the dual-purpose heat spreader 104 is still capable of making contact with additional heat sink components of a system slot when the module 100 is plugged into a node (e.g., a liquid-cooled cold-plate).

In various embodiments, the top surface of the fiber harness assembly 102 (top surface 150 shown in FIG. 1B) can be designed to assist in the heat transfer functions of the dual-purpose heat spreader 104. The dual-purpose heat spreader 104 makes contact with a plurality of thermal interface pads (not shown in FIGS. 1A and 1B) disposed on the module board 106. The thermal interface pads may be disposed on the printed circuit board of the module board 106 and/or on the components disposed on the module board 106 (e.g., each of the integrated circuits 132, voltage regulators, etc.). The dual-purpose heat spreader 104 is configured, through contact with the thermal interface pads, to transfer heat within the module 100 during operation to ensure that the temperature does not exceed an operational temperature threshold. In various embodiments, the top surface 150 of the fiber harness assembly 102 can be configured to assist in the heat transfer functionality of the dual-purpose heat spreader 104. In such embodiments, the top surface 150 may be constructed from a material with good thermal conductivity, including but not limited to copper and aluminum. The top surface 150 of the fiber harness assembly 102 and the top surface 250 of the dual-purpose heat spreader 104 (as shown in FIG. 2) can be co-planar (i.e., the top surface 150 can be substantially even with the top surface 250 when the fiber harness assembly 102 is mated with the dual-purpose heat spreader 104) such that both surfaces 150, 250 make contact with a cold-plate or other thermal control components within the slot of a computing device when the module 100 is connected. In various embodiments, the fiber harness assembly 102 and/or the trench 126 could further include a plurality of spring clips or other connection points (the implementations of which are known/well-understood by those skilled in the art) disposed thereon to assist in thermally connecting the top surface 150 to the thermal control components within the slot of the computing device. In some embodiments, the top surface 150 of the fiber harness assembly 102 may be configured such that it rests higher than the top surface 250 of the dual-purpose heat spreader 104 when the module 100 is not inserted into a slot of a computing device. When inserted, the fiber harness assembly 102 can be pushed down into the trench 126 by pressure applied by the thermal control components (e.g., a cold-plate) within the slot, forcing the top surface 150 of the fiber harness assembly 102 to become co-planar with the top surface 250 of the dual-purpose heat spreader 104. All the leading edges 110 of the raised fiber harness assembly 102 that are facing towards a slot (of a computing device) may be sloped in order for the module 100 to be easily inserted into the slot. A plurality of connection points may further be disposed on the fiber harness assembly spine 124 of fiber harness assembly 102 and on the back side 202a and the branched side 202c of the dual-purpose heat spreader 104 to assist in thermal connection.

The dual-purpose heat spreader 104 is designed not only to facilitate heat transfer during operation, but also to accommodate the optical infrastructure supported by the fiber harness assembly 102. FIG. 2 shows the example dual-purpose heat spreader 104 of FIG. 1A. The scope of the technology disclosed herein is not limited solely to the depicted embodiment of FIG. 2. To accommodate the optical infrastructure, the dual-purpose heat spreader 104 includes an infrastructure trench 126 formed within the dual-purpose heat spreader 104. The trench 126 is defined by a back side 202a, a base 202b, and a branched side 202c. The back side 202a can comprise a side wall of the dual-purpose heat spreader 104 as shown in FIG. 2, but the back side 202a can be disposed within the interior of the dual-purpose heat spreader 104 in other embodiments (e.g., another indentation or other component may be disposed in the dual-purpose heat spreader 104 between the back side 202a and the side wall of the dual-purpose heat spreader 104). Opposite the back side 202a is the branched side 202c, which can include a plurality of segments, with openings between the segments associated with a branch 114 of the fiber harness assembly 102 discussed with respect to FIG. 1A. The back side 202a and the branch side 202c is separated by the base 202b. The base 202b is disposed below the top surface 250 of the dual-purpose heat spreader 104 such that the trench 126 has a depth d. In various embodiments, the depth d can be less than the total height of the dual-purpose heat spreader 104.

The depth d may be configured such that, when inserted, the fiber harness assembly 102 sits within the trench 126 and a top surface of the fiber harness assembly 102 sits even with or slightly below the top surface 250 of the dual-purpose heat spreader 104. It should be understood that in a configuration where the top surface of the fiber harness assembly 102 sits below the top surface 250, the top surface 250 will not participate in any heat transfer. In various embodiments, the depth of the trench 126 may vary. As illustrated in FIG. 2, the trench 126 may have a first depth d, a branch depth $d_b$, and an inlet depth $d_i$. In various embodiments, the branch depth $d_b$ can be bigger than the first depth d to provide additional clearance to the optical connector associated with the particular branch 114 of the fiber harness assembly 102. The inlet depth $d_i$ may be bigger than the first depth d to provide additional clearance for a plurality of optical fibers to be routed through the trench 126 without the need for the optical fibers being routed to the optical connectors on the branches 114 to be routed at angles which can cause damage to the optical fibers. It should be noted that in some embodiments, the depth of optical socket opening 214 may be the same as a total depth of the dual-purpose heat spreader 104. In various embodiments, the one or more of the depths may vary along a gradient from a maximum to a minimum.

The trench 126 may comprise trench branches 204a, 204b, 204c (collectively, "the trench branches") corresponding to the branches 114 discussed with respect to FIGS. 1A-1B. Each trench branch includes a chip ferrule opening 206 configured to enable an optical chip ferrule to interface with the socket 110 associated with that particular branch 114. The chip ferrule opening 206 extends the entire height of the dual-purpose heat spreader 104. In various embodiments, the chip ferrule opening 206 may include one or more alignment features to align the chip ferrule for connecting to the socket 110 discussed with respect to FIGS. 1A and 1B. One or more chip ferrule retaining features 208 may be disposed on the trench branch 204 to enable the chip ferrule to be secured to the dual-purpose heat spreader 104, minimizing alignment issues and ensuring that the chip ferrule and fiber harness assembly are secured at or below the surface 250 of the dual-purpose heat spreader 104. In some embodiments, the one or more retaining features 208 may comprise an alignment features.

The dual-purpose heat spreader 104 further includes a connector bay 210 disposed on proximal end of the dual-purpose heat spreader 104. The connector bay 210 serves to house the blindmate connector for the electro-optical hot-pluggable optical module 100. Moreover, the connector bay 210 is configured to aggregate all of the optical fibers of the fiber harness assembly 102. In some embodiments, a fiber box (not shown in FIG. 2) may rest within the connector bay 210 and configured to manage the optical fibers routing through the fiber harness assembly 102. In various embodiments, the connector bay 210 may include a scan opening 212, configured to enable reading of an identification tag identifying the particular fiber harness assembly 102 installed. In various embodiments, the identification tag (not shown in FIG. 2) can comprise an RFID tag, an NFC tag, or other identification tags commonly known in the art and used to identify components. As shown in FIG. 1A, a tag reader 112 can be disposed on the module board 106 and positioned to correspond with the scan opening 212. In this way, the fiber harness assembly 102 installed can be determined upon installation, enabling the same heat spreader and module electro-optical design to be utilized in multiple architectures by simply switching out the fiber harness assembly 102 utilized.

Referring back to FIG. 1A, the dual-purpose heat spreader 104 is disposed on top of the module board 106 comprising a plurality of integrated circuits 132. Each integrated circuit 132 comprises an optical socket 110 and circuitry for converting signals between optical and electrical. The module board 106 comprises one or more printed circuit boards (PCBs) having disposed thereon a plurality of electrical traces. Each of the integrated circuits 132 are positioned to correspond with one of the plurality of branches 114 of the fiber harness assembly 102 so that the chip optical connector on each branch 114 is positioned above the corresponding socket 110 of the integrated circuit 132. In this way, when the fiber harness assembly 102 is mated with the trench 126 of the dual-purpose heat spreader 104 the chip optical connector on a branch 114 can mate with the corresponding optical socket 110. A slot interface 130 is disposed on an interior end of the module board 106. When the optical module 100 is inserted into a slot of a computing device, the slot interface 130 is configured to mate with a corresponding board connector within the slot to provide the electrical connection between the module board 106 and the computing device.

Figure 3:
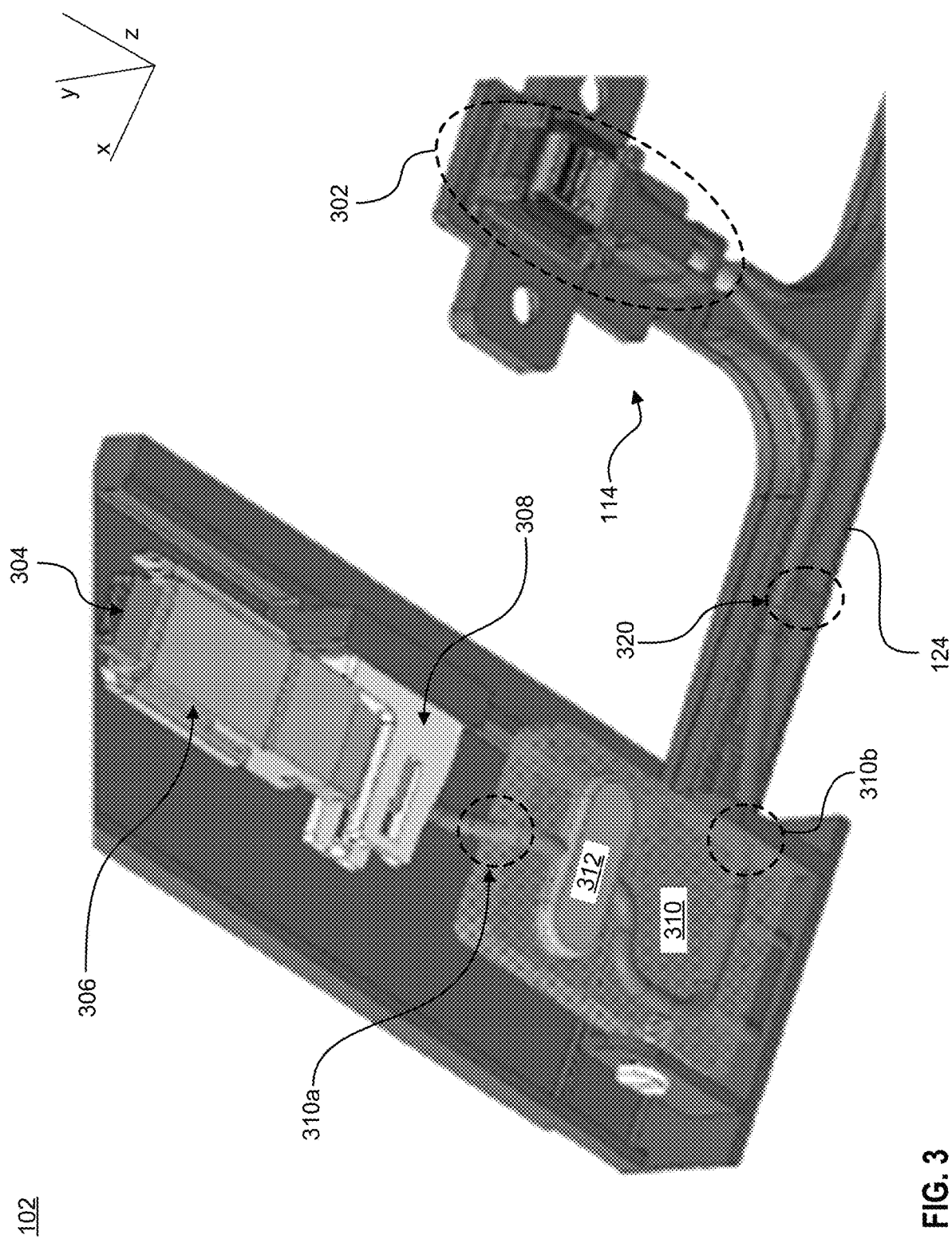
FIG. 3 shows an underside of an example fiber harness assembly in accordance with embodiments of the technology disclosed herein.
Figure 4:
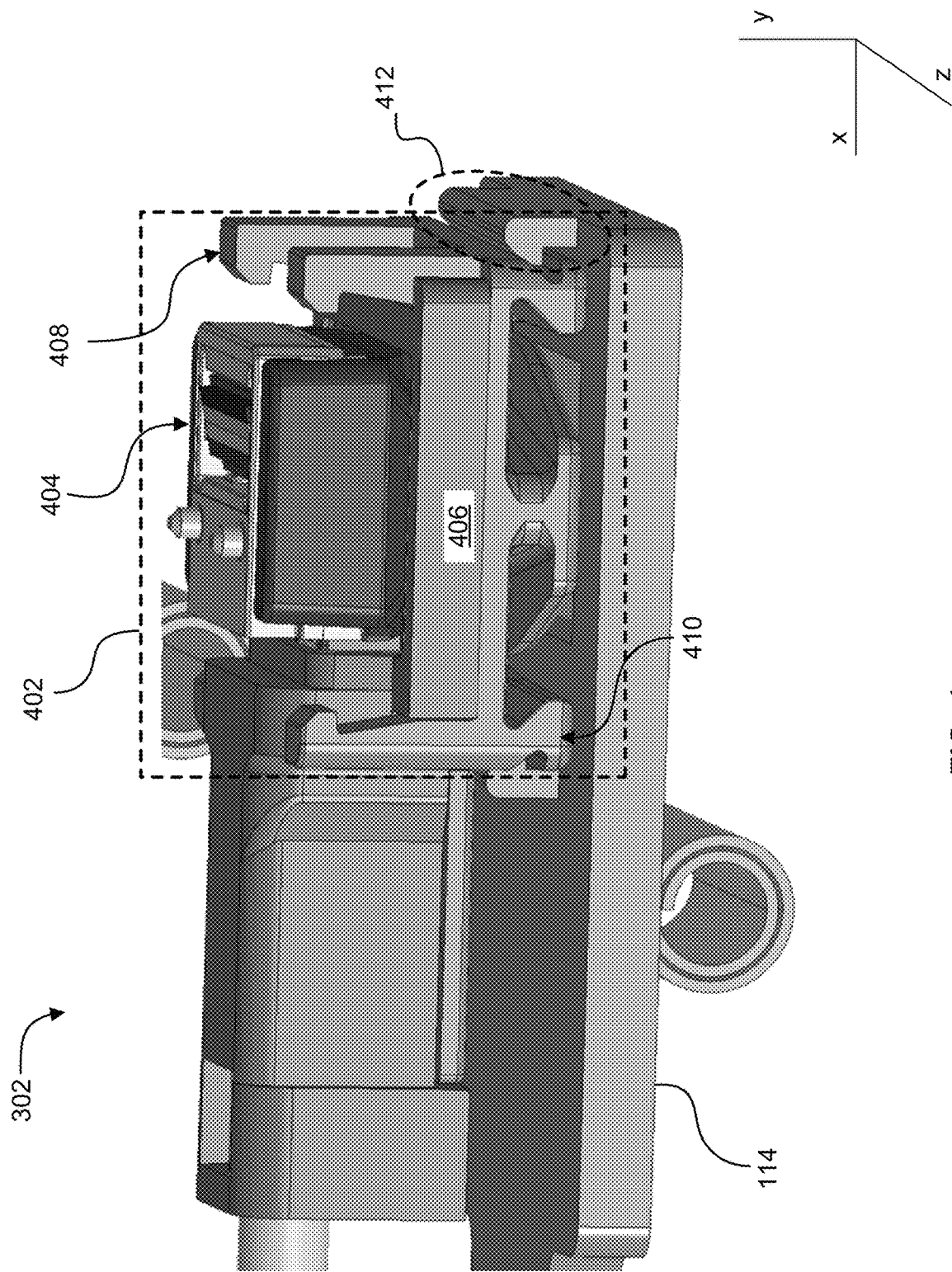
FIG. 4 shows an example optical connector in accordance with embodiments of the technology disclosed herein.

FIG. 3 illustrates a portion of the fiber harness assembly 102 discussed with respect to FIG. 1 from the underside. The example view in FIG. 3 includes a portion of the fiber harness spine 124, one of the plurality of branches 114, and the connector bay cover 120 discussed with respect to FIG. 1. On the underside of the branch 114, a chip optical connector 302 is affixed to a distal end of the branch 114 (being distal from the fiber harness assembly spine 124. In various embodiments, the branch 114 may include one or more securing features (not shown in FIG. 3) on its distal end and configured to secure the chip optical connector 302 to the branch 114. FIG. 4 illustrates an example chip optical connector 302 in accordance with embodiments of the technology disclosed herein. As depicted, the chip optical connector 302 includes a chip ferrule clip assembly 402 comprising a chip ferrule 404 disposed on a first surface of a clip base 406. The chip ferrule 404 provides the optical interface between the socket 110 and the optical fibers within the chip optical connector 302. The clip base 406 further comprises socket securing features 408 and branch securing features 410 to enable the chip ferrule clip assembly 402 to be affixed to the branch 114 and to be secured to the socket 110. As shown in FIG. 4, the branch securing features 410 extending along the Y-direction from the clip base 406 towards the branch 114. The branch securing features 410 are configured to mate with corresponding securing features 412 disposed on the branch 114. The socket securing features 408 are configured to extend upwards along the Y-direction from the clip base (i.e., in the opposite direction from the branch securing features 410). The socket securing features 408 are configured to mate with corresponding features on the socket 110, thereby enabling for chip ferrule 404 to be securely communicatively coupled to the opto-electronics of the socket 110.

Referring back to FIG. 3, the fiber harness assembly 102 includes an optical blindmate connector bracket 308 attached to a side of the fiber harness assembly 102. The optical blindmate connector bracket 308 is configured to allow movement of the blindmate connector housing 306 along the X and Y axis (as depicted by the coordinates in the corner of FIG. 3). In various embodiments, the bracket 308 can be made of any metallic, non-metallic, alloy, plastic, or other suitable material. The blindmate connector housing 306 is configured to house the blindmate ferrule 304, which comprises a plurality of optical lenses or fiber positions for transmitting and receiving optical signal. In various embodiments, the blindmate ferrule 304 can include ferrules for upwards of 48 optical fibers where there are three integrated circuits disposed on the module board 106, though the density of the optical blindmate ferrule 304 can increase depending on the specific dimensions of the implementation. The optical blindmate ferrule 304 can enable the optical ferrules to float in the Z direction to minimize the amount of force exerted on the ferrules when being installed in a computing device (e.g., server slot) when not perfectly aligned. In various embodiments, a blindmate receptacle 118 can be included in the dual-purpose heat spreader 104 as shown in FIGS. 1A and 1B. The blindmate receptacle 118 can include one or more alignment features to enable coarse alignment of the optical ferrules. The one or more alignment features can include, but not limited to, ramp entry surfaces, pitched interior side walls, slanted ridges, or other features configured to coarsely align the blindmate ferrule 304. Coarse alignment in the present disclosure refers to aligning the blindmate ferrule 304 such that the optical ferrules of the blindmate ferrule 304 is positioned parallel to an optical interface within a server slot to enable a connection. In various embodiments, the blindmate receptacle 118 can comprise one or more of metal, plastic, alloy, or other material, and in some embodiments the blindmate receptacle 118 may be made of the same material as the dual-purpose heat spreader 104. In some embodiments, the blindmate receptacle 118 can be removable from the dual-purpose heat spreader 104, in other embodiments the blindmate receptacle 118 may be built into the dual-purpose heat spreader 104.

The optical fibers egressing from the blindmate connector housing 306 are routed through a fiber box 310. The fiber box 310 is shown as being transparent in FIG. 3 for ease of understanding and should not be interpreted as limiting the scope of the technology to only transparent implementations. The fiber box 310 serves to manage the optical fibers from the optical blindmate housing 306 and order the fibers to be routed along the fiber harness assembly 102 to one of the plurality of chip optical connectors 302. In various embodiments, the fiber box 310 can be configured to provide straight routing of the optical fibers, while in other embodiments the fiber box 310 can be configured as a fiber shuffle. In various embodiments, the fiber box 310 can be removably secured to the fiber harness assembly 102. In this way, the same fiber harness assembly 102 can be modified to provide a different optical routing architecture by swapping out the fiber box 310. In various embodiments, the fiber box 310 can comprise two junctions 310a, 310b. Each junction 310a, 310b can comprise an optical connector (not shown in FIG. 3). In this way, the fiber box 310 can be interchanged with a different type without the need to replace the optical fibers running along the underside of the fiber harness assembly 102 to the branches 114, the blindmate housing 306, or a combination thereof. In some embodiments, the junction 310a, 310b can be openings through which optical fibers can be routed within the fiber box 310.

An ID tag 312 is disposed on a bottom side of the fiber box 310. The ID tag 312 can be configured to store information identifying the fiber harness assembly 102 configuration. As discussed above, the ID tag 312 is positioned so that the tag reader 112 on the module board 106 (as shown in FIG. 1A) can access the ID tag 312 through the scan opening 212 (as shown in FIG. 2) of the dual-purpose heat spreader 104. In various embodiments, the ID tag 312 can be one or more of an RFID tag, and NFC tag, or other wireless-based identification technologies. In other embodiments, the ID tag 312 can be a matrix barcode-type tag or other optical-based tag, with the tag reader 112 being configured to scan or capture the code.

Referring back to FIG. 1A, a carrier 108 can serve as a housing for the fiber harness assembly 102, the dual-purpose heat spreader 104, and the module board 106. The carrier 108 may be constructed out of formed sheet metal in some embodiments, while in other embodiments the carrier 108 may be constructed out of plastic or some type of alloy. The carrier 108 can include a plurality of retention openings 122 configured to enable the components shown in FIG. 1A to be packaged together to form the optical module 100, as shown in FIG. 1B. Each retention opening 122 is positioned such that corresponding openings on the dual-purpose heat spreader 104 and the module board 106, through which a screw or other securing means can be inserted. In various embodiments, the carrier 108 may include one or more features configured to assist in inserting the optical module 100 into a slot on a computing device.

Figure 5:
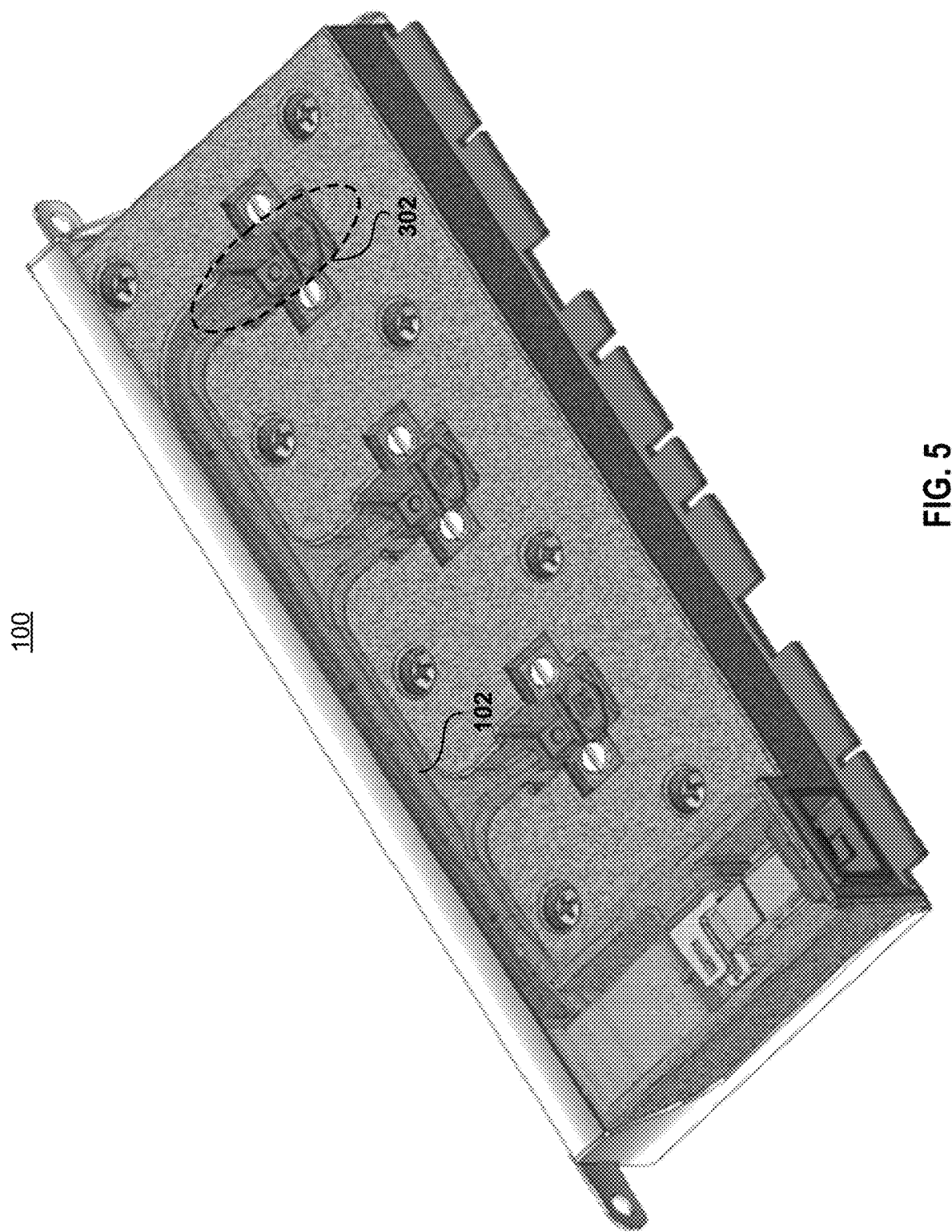
FIG. 5 shows an example view of the electro-optical hot-pluggable optical module of FIGS. 1A and 1B with a transparent fiber harness assembly in accordance with embodiments of the technology disclosed herein.

In some embodiments, the chip optical connectors 302 of the fiber harness assembly 102 may be connected such that no individual chip optical connector 302 can be disconnected from its corresponding socket 110 without removing all of the chip optical connectors 302. FIG. 5 is a perspective view of the electro-optical hot-pluggable optical module 100 discussed with respect to FIG. 1, with the fiber harness assembly 102 being transparent to allow a view of the internal optical infrastructure. As shown in FIG. 5, each of the chip optical connectors 302 is connected to its corresponding socket (not shown in FIG. 5). Each chip optical connector 302 is secured using one or more screws or other securing means configured to secure the chip optical connector 302 using the chip ferrule retaining features 208 discussed with respect to FIG. 3.

Figure 6:
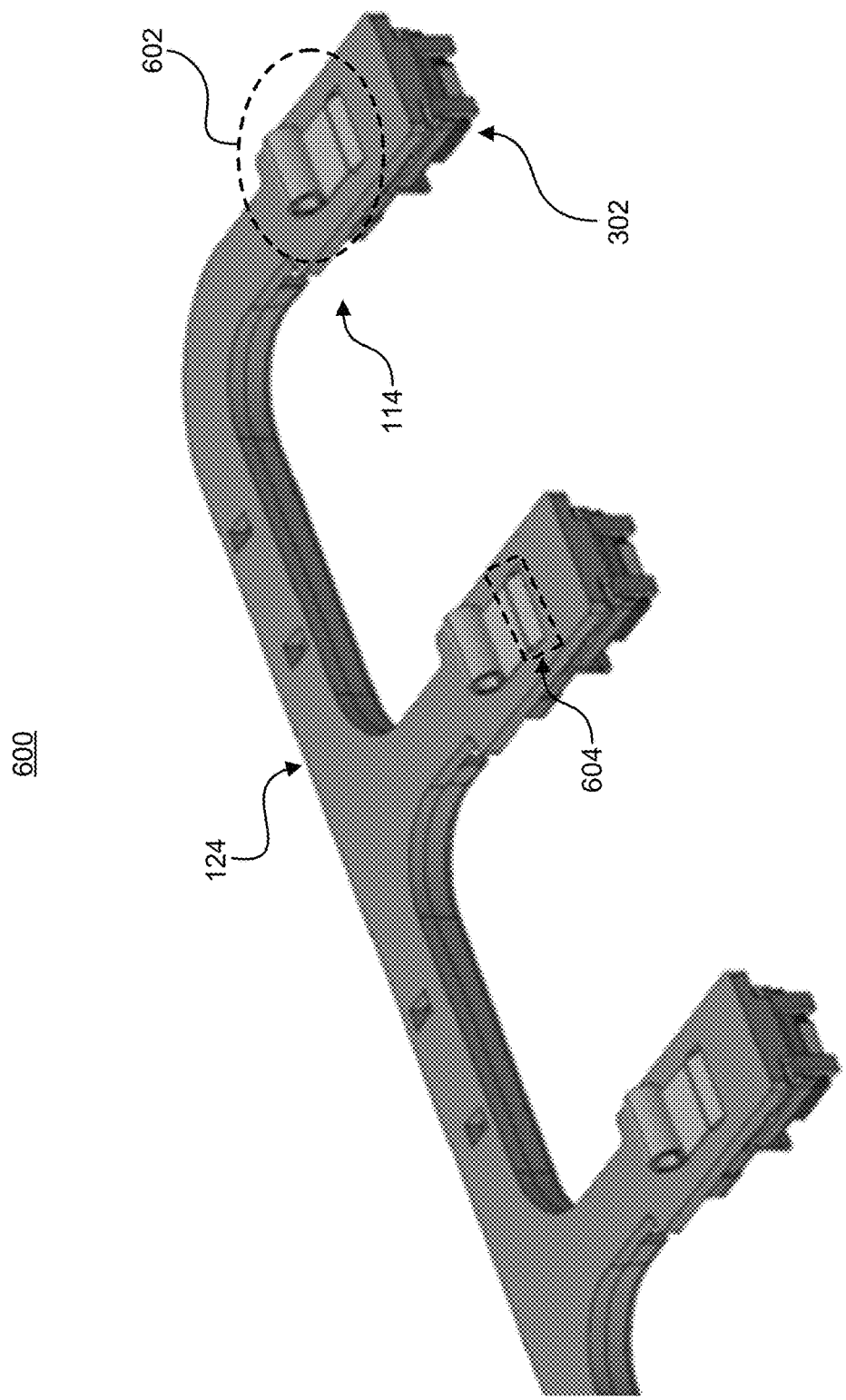
FIG. 6 shows another example fiber harness assembly in accordance with embodiments of the technology disclosed herein.

As can be seen in FIG. 5, the chip optical connectors 302 do not include means by which an individual chip optical connector 302 can be released from the socket. Rather, the entire fiber harness assembly 102 would need to be removed in order to disconnect any individual chip optical connectors 302. In some implementations, providing greater flexibility may reduce the stress applied to the chip ferrule during manufacture. FIG. 6 illustrates another example fiber harness assembly 600 in accordance with embodiments of the technology disclosed herein. The fiber harness assembly 600 includes the same components of the fiber harness assembly 102 discussed with respect to FIGS. 1-5 with the addition of a tab 602 associated with each chip optical connector 302 on each branch 114. The tab 602 enables each chip optical connector to be individually disconnected from its corresponding socket. A tab opening 604 in the branch 114 enables the tab to connect to the chip ferrule clip assembly to disengage the socket securing features, releasing the chip ferrule from the socket. Each chip optical connector 302 can be disconnected independently from its corresponding socket, while the other chip optical connectors 302 are unaffected. In various embodiments, the fiber harness spine 124 can be constructed of a flexible material to enable each of the branches 114 to move independently of each other. In this way, the flexing can enable the other chip optical connectors 302 to remain engaged with the corresponding socket without being impacted by any other chip optical connector 302 being disengaged.

As depicted, the tab 602 comprises a roll-away pull tab. The roll-away pull tab is a tab that allows the chip optical connector 302 to be disconnected by pulling on the tab 602. A distal end of the roll-away pull tab (i.e., the end extending away from the chip optical connector 302) includes a rolled structure. The rolled structure can comprise a memory material capable of being designed with a "memorized" shape such that the rolled structure can be stretched straight when needed but, when the force is removed, would return to the rolled shape of the rolled structure. Non-limiting examples of the rolled structure include shape memory allows (SMA) or other materials capable of being designed with a memorized shape, including but not limited to sheet metal and plastic. In some embodiments, only the rolled structure portion of the roll-away pull tab comprises a memory material, while in other embodiments all of the roll-away pull tab can comprise the memory material. When inserted into a slot of a server or other computing device, the rolled structure of the roll-away pull tab would stretch to lay flat against the branch 114 to not interfere with the interface between the heat spreader (not shown in FIG. 6) and the thermal control components within the slot. When removed, the rolled structure would reform. In some embodiments, a recess on the top surface of the branch 114 may be included such that the roll-away pull tab can lay flush (i.e., co-planar) with the top surface of the branch 114 when the module 100 is inserted into the slot.

Although discussed with respect to a roll-away pull tab example, the tab 602 is not limited only to the roll-away style embodiment discussed. Other types of tabs that enable individual control over the chip optical connector 302 connections can be used in various implementations. As a non-limiting example, a straight pull tab can be utilized that does not include a rolled structure. Rather, the tab can lay substantially flat on the branch 114 when installed in a slot or not, and can be used by lifting the end of the tab off the surface and pulling the tab. As another non-limiting example, a lever type tab can be included that lies substantially flat against the branch 114. The lever type tab can be designed such that when the tab is lifted up off the surface of the branch 114 the chip optical connector is disengaged from the socket. A person of ordinary skill in the art would appreciate that tabs having a low profile are applicable to the technology disclosed herein and this disclosure should not be limited to only the disclosed embodiments.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. An optical module comprising:
a fiber harness assembly, wherein the fiber harness assembly comprises a plurality of optical connection branches extending from a fiber harness assembly spine;
a dual-purpose heat spreader comprising a trench, wherein the fiber harness assembly is disposed within the trench;
a module board comprising a plurality of sockets, the dual-purpose heat spreader disposed on top of the module board; and
a carrier configured to secure the dual-purpose heat spreader and the module board.

2. The optical module of claim 1, wherein each optical connection branch comprises a chip optical connector disposed on a distal end.

3. The optical module of claim 1, wherein the fiber harness assembly spine and the plurality of optical connection branches comprise a monolithic structure.

4. The optical module of claim 1, wherein each of the optical connection branches of the plurality of optical connection branches is affixed to the fiber harness assembly spine.

5. The optical module of claim 1, wherein the fiber harness assembly further comprises a connector bay cover.

6. The optical module of claim 1, wherein the trench of the dual-purpose heat spreader has a depth configured such that the fiber harness assembly rests even with or below a top surface of the dual-purpose heat spreader.

7. An optical module comprising:
a fiber harness assembly;
a dual-purpose heat spreader comprising a trench, wherein the fiber harness assembly is disposed within the trench, wherein the trench incudes a first depth, a branch depth, and an inlet depth;
a module board comprising a plurality of sockets, the dual-purpose heat spreader disposed on top of the module board; and
a carrier configured to secure the dual-purpose heat spreader and the module board.

8. The optical module of claim 7, wherein the branch depth differs from the first depth on a gradient.

9. An optical module comprising:
a fiber harness assembly comprising a fiber box;
a dual-purpose heat spreader comprising a trench and a connector bay, wherein the fiber harness assembly is disposed within the trench, the connector bay configured to house the fiber box;
a module board comprising a plurality of sockets, the dual-purpose heat spreader disposed on top of the module board; and
a carrier configured to secure the dual-purpose heat spreader and the module board.

10. The optical module of claim 9, wherein the fiber box is configured as a fiber shuffle.

11. An optical module comprising:
a fiber harness assembly;
a dual-purpose heat spreader comprising a trench and a connector bay, wherein the fiber harness assembly is disposed within the trench and, wherein the connector bay further comprises a scan opening and the module board further comprising a tag reader;
a module board comprising a plurality of sockets, the dual-purpose heat spreader disposed on top of the module board; and
a carrier configured to secure the dual-purpose heat spreader and the module board.

12. The optical module of claim 11, wherein the tag reader is configured to scan an ID tag affixed to the fiber box through the scan opening.

13. The optical module of claim 11, wherein the tag reader comprises an RFID tag reader or an NFC tag reader.

14. A system, comprising:
a computing device comprising at least one line card having one or more slots; at least one optical module within a slot of the one or more slots, the optical module comprising:
a fiber harness assembly;
a dual-purpose heat spreader comprising a trench, wherein the fiber harness assembly is disposed within the trench, wherein the trench has a first depth, a branch depth, and an inlet depth;

a module board comprising a plurality of sockets, the dual-purpose heat spreader disposed on top of the module board; and a carrier configured to secure the dual-purpose heat spreader and the module board, wherein the dual-purpose heat spreader is configured to mate with a cold-plate within the slot when the optical module is inserted into the slot.

15. The optical module of claim 14, the trench of the dual-purpose heat spreader having a depth configured such that the fiber harness assembly rests even with or below a top surface of the dual-purpose heat spreader.

16. The optical module of claim 14, wherein the branch depth differs from the first depth on a gradient.

17. A dual-purpose heat spreader comprising:

a trench configured to accept a fiber harness assembly, the fiber harness assembly comprising a plurality of optical components;

a connector bay configured to accept a fiber box, a blindmate connector housing and a blindmate receptacle interface; and a plurality of chip ferrule openings, each chip ferrule opening configured such that a chip optical connector of the fiber harness assembly is accessible by a socket on a module board disposed below the dual-purpose heat spreader.

* * * * *